United States Patent
Jiang et al.

(10) Patent No.: US 11,994,973 B2
(45) Date of Patent: May 28, 2024

(54) INTEGRATED DEVELOPMENT ENVIRONMENT TERMINAL, PLATFORM SERVER, AND MEDIUM

(71) Applicant: ALIBABA GROUP HOLDING LIMITED, Grand Cayman (KY)

(72) Inventors: Long Jiang, Hangzhou (CN); Jianyi Meng, Hangzhou (CN); Chunqiang Li, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 227 days.

(21) Appl. No.: 17/114,576

(22) Filed: Dec. 8, 2020

(65) Prior Publication Data
US 2021/0182176 A1 Jun. 17, 2021

(30) Foreign Application Priority Data
Dec. 12, 2019 (CN) .......................... 201911273687.5

(51) Int. Cl.
G06F 11/36 (2006.01)
G06F 8/77 (2018.01)

(52) U.S. Cl.
CPC ............ *G06F 11/3624* (2013.01); *G06F 8/77* (2013.01)

(58) Field of Classification Search
CPC .......... G06F 8/77; G06F 11/3624; G06F 8/71; G06F 8/70; G06F 11/3664; G06F 11/366; G06F 11/079
(Continued)

(56) References Cited

U.S. PATENT DOCUMENTS 7,149,698 B2  12/2006 Guheen et al.
7,359,831 B2   4/2008 Shrivastava et al.
(Continued)

FOREIGN PATENT DOCUMENTS

CN  110188044 A  8/2019
EP    3213217 B1  6/2020
JP  S63228342 A  9/1988

OTHER PUBLICATIONS

First Search for Chinese Application No. 201911273687.5 dated May 27, 2022.
(Continued)

*Primary Examiner* — Wei Y Zhen
*Assistant Examiner* — Mohammed N Huda

(57) ABSTRACT

Methods, systems, and apparatus, including computer programs encoded on computer storage media, for error handling in an integrated development environment (IDE) are provided. One of the methods, applicable to an IDE server, includes: sending a project package comprising a plurality of components supporting development of an application to an IDE terminal in response to a query of the IDE terminal; receiving a first error identifier indicating an error that occurs to the project package from the IDE terminal; determining an erroneous component where the error occurs from the plurality of components in the project package based on the first error identifier; determining a diagnosis solution corresponding to the first error identifier and the erroneous component by looking up mapping relationships stored on the server between error identifiers and diagnosis solutions associated with the plurality of components; and returning the determined diagnosis solution to the IDE terminal.

18 Claims, 7 Drawing Sheets

(58) Field of Classification Search
USPC ........................................................ 717/101
See application file for complete search history.

(56) References Cited

U.S. PATENT DOCUMENTS

| | | | |
|---|---|---|---|
| 7,395,458 B2 | 7/2008 | Shrivastava et al. | |
| 7,620,907 B2 | 11/2009 | Resnick et al. | |
| 7,831,410 B2 | 11/2010 | Mcintyre et al. | |
| 8,544,016 B2 | 9/2013 | Friedman et al. | |
| 8,555,238 B2 | 10/2013 | White et al. | |
| 8,903,762 B2 | 12/2014 | Jin et al. | |
| 9,529,657 B2 | 12/2016 | Jan et al. | |
| 9,858,044 B2 | 1/2018 | Chouinard et al. | |
| 10,380,003 B2 | 8/2019 | Davis | |
| 10,757,000 B2 | 8/2020 | Gelvin et al. | |
| 11,194,564 B1* | 12/2021 | Dwivedi et al. | G06F 8/71 |
| 2003/0120600 A1* | 6/2003 | Gurevich | G06F 9/542 |
| | | | 705/50 |
| 2005/0038832 A1 | 2/2005 | Feigenbaum | |
| 2006/0293934 A1 | 12/2006 | Tsyganskiy et al. | |
| 2007/0028219 A1 | 2/2007 | Miller et al. | |
| 2007/0028220 A1 | 2/2007 | Miller et al. | |
| 2009/0328004 A1 | 12/2009 | Balasubramanian | |
| 2010/0057522 A1 | 3/2010 | Borowski et al. | |
| 2014/0304699 A1* | 10/2014 | He et al. | G06F 8/65 |
| | | | 717/171 |
| 2015/0269060 A1 | 9/2015 | Rodmell | |
| 2016/0321055 A1 | 11/2016 | Mihalcea et al. | |
| 2017/0004065 A1 | 1/2017 | Angwin et al. | |
| 2019/0347149 A1 | 11/2019 | Panigrahi et al. | |
| 2020/0394098 A1* | 12/2020 | Frazier et al. | G06F 11/079 |
| 2021/0173621 A1* | 6/2021 | Fender et al. | G06F 8/71 |

OTHER PUBLICATIONS

Written Opinion and International Search Report for PCT Application No. PCT/US2020/063687 dated Mar. 10, 2021.

* cited by examiner

INTEGRATED DEVELOPMENT ENVIRONMENT TERMINAL, PLATFORM SERVER, AND MEDIUM

CROSS-REFERENCE TO RELATED APPLICATION

This application is based on and claims priority to and benefit of Chinese Patent Application No. 201911273687.5, filed with the China National Intellectual Property Administration on Dec. 12, 2019, and entitled "integrated development environment terminal, platform server, and medium." The entire content of the above-identified application is incorporated herein by reference in its entirety.

TECHNICAL FIELD

The application relates to the field of integrated development environments (IDEs), and in particular, to an IDE terminal, platform server, and medium.

BACKGROUND

An IDE is an application program used to provide a program development environment, and an integrated development software service set with functions such as code writing, analysis, compilation, and debugging. The IDE is used for various types of application development, and provides a development environment with a graphic interface.

A system executing an IDE usually includes an IDE terminal and a platform server. The IDE terminal is a terminal on which a user conducts development. The platform server is a server providing the user with a software set required for the development. After obtaining the software set required for the development and returned by the platform server, the user of the IDE terminal may use the software set to conduct the development on the IDE terminal. The software set required by the user for the development is referred to as a project package. A project package has a plurality of types of components required for development, such as an application component, a development container component, a chip component, a kernel component, and a middleware component. After receiving the components, the IDE terminal may compile and run the components, to use the components to conduct development on the IDE.

On existing IDE terminals, once an error occurs during subsequent compiling and executing of the components, a diagnosis solution is usually searched online. If no diagnosis solution can be determined, an email is sent to a technical email address of a platform server administrator, to wait for a reply. However, in many events, administrators are not front-line developers, are unfamiliar with the problems, and need to further forward emails to developers for resolution, resulting in untimely responses and low problem resolving efficiency. In addition, the project package is the result of participation of a plurality of parties, such as chip developers and development container developers, many of whom may not belong to a same company, making it difficult to pinpoint the developers.

SUMMARY

The application is intended to improve efficiency of obtaining a diagnosis solution after an error occurs in a component obtained in an IDE environment.

To achieve the objective, according to a first aspect of the application, an embodiment of the application provides a computer-implemented method for error handling. The method is applicable to a server in an integrated development environment (IDE) system comprising the server and an IDE terminal, and comprises: sending a project package for development of an application to the IDE terminal in response to a query of the IDE terminal, wherein the project package comprises a plurality of components supporting the development of the application; receiving a first error identifier from the IDE terminal, wherein the first error identifier indicates an error that occurs to the project package; determining an erroneous component from the plurality of components in the project package based on the first error identifier, wherein the erroneous component comprises a component where the error occurs; determining a diagnosis solution corresponding to the first error identifier and the erroneous component by looking up mapping relationships stored on the server between error identifiers and diagnosis solutions associated with the plurality of components; and returning the determined diagnosis solution to the IDE terminal.

In some embodiments, determining an erroneous component from the plurality of components in the project package based on the first error identifier comprises: looking up an error identifier, application, and erroneous component mapping relationship table stored on the server to determine the erroneous component according to the first error identifier and the application.

In some embodiments, determining an erroneous component from the plurality of components in the project package based on the first error identifier comprises: receiving an identifier of the erroneous component along with the first error identifier from the IDE terminal.

In some embodiments, the error occurs during compiling, downloading, or executing of the project package.

In some embodiments, the plurality of components comprise an application component, a chip component, a board component, a kernel component, a middleware component that correspond to the application, or a combination thereof and the erroneous component comprises the chip component, the board component, the kernel component, the middleware component, or a combination thereof.

In some embodiments, the method further comprises: receiving a first feedback from the IDE terminal, wherein the first feedback indicates that the diagnosis solution fails to resolve the error indicated by the first error identifier; obtaining information of a developer terminal of the erroneous component; and returning the information of the developer terminal of the erroneous component to the IDE terminal, for the IDE terminal to establish communication with the developer terminal of the erroneous component.

In some embodiments, the method further comprises: receiving a second feedback from the IDE terminal, wherein the second feedback indicates that the error indicated by the first error identifier has not been resolved after the communication is established with the developer terminal of the erroneous component; obtaining information of developer terminals of the plurality of components; and returning the information of developer terminals of the plurality of components to the IDE terminal, for the IDE terminal to establish a group communication with the developer terminals of the plurality of components.

In some embodiments, the method further comprises: if the error indicated by the first error identifier is resolved after the communication is established with the developer terminal of the erroneous component or the group communication is established with the developer terminals of the plurality of components, receiving a diagnosis solution that corresponds to the first error identifier and is obtained by the IDE terminal from a record of the communication with the developer terminal of the erroneous component or a record of the group communication with the developer terminals of the plurality of components, and storing the diagnosis solution in association with the erroneous component.

In some embodiments, the method further comprises: if the error indicated by the first error identifier is resolved after the communication is established with the developer terminal of the erroneous component or the group communication is established with the developer terminals of the plurality of components, receiving a diagnosis solution that corresponds to the first error identifier and is obtained by the IDE terminal from a record of the communication with the developer terminal of the erroneous component or a record of the group communication with the developer terminals of the plurality of components, storing the diagnosis solution in a record table stored on the server, and in response to identical diagnosis solutions that correspond to the first error identifier and are recorded in the record table reaching a predetermined quantity, updating a diagnosis solution stored in association with the erroneous component by using the identical diagnosis solutions.

According to a second aspect of the application, an apparatus for error handling is provided. The apparatus is applicable to a server in an integrated development environment (IDE) system comprising the server and an IDE terminal, and comprises: one or more processors and one or more non-transitory computer-readable memories coupled to the one or more processors and configured with instructions executable by the one or more processors to cause the apparatus to perform operations comprising: sending a project package for development of an application to the IDE terminal in response to a query of the IDE terminal, wherein the project package comprises a plurality of components supporting the development of the application; receiving a first error identifier from the IDE terminal, wherein the first error identifier indicates an error that occurs to the project package; determining an erroneous component from the plurality of components in the project package based on the first error identifier, wherein the erroneous component comprises a component where the error occurs; determining a diagnosis solution corresponding to the first error identifier and the erroneous component by looking up mapping relationships stored on the server between error identifiers and diagnosis solutions associated with the plurality of components; and returning the determined diagnosis solution to the IDE terminal.

According to a third aspect of the application, a non-transitory computer-readable storage medium is provided. The non-transitory computer-readable storage medium is configured with instructions executable by one or more processors to cause the one or more processors to perform operations comprising: sending a project package for development of an application to the IDE terminal in response to a query of the IDE terminal, wherein the project package comprises a plurality of components supporting the development of the application; receiving a first error identifier from the IDE terminal, wherein the first error identifier indicates an error that occurs to the project package; determining an erroneous component from the plurality of components in the project package based on the first error identifier, wherein the erroneous component comprises a component where the error occurs; determining a diagnosis solution corresponding to the first error identifier and the erroneous component by looking up mapping relationships stored on the server between error identifiers and diagnosis solutions associated with the plurality of components; and returning the determined diagnosis solution to the IDE terminal.

In the embodiments of the application, after receiving a project package required for development of an application and returned by a platform server, if an error occurs during compiling components in the project package, an IDE terminal detects an erroneous component in the project package in which the error is located, and notifies the platform server of the error and the detected erroneous component, and the platform server returns a diagnosis solution to the error for the erroneous component. The entire process is automatic, without requiring manually searching online for solutions or seeking help from administrators or other personnel. In an IDE, an erroneous component in which an error is located is automatically detected, and diagnosis solutions corresponding to different errors for erroneous components are set on a platform server. In the process, a diagnosis solution is automatically obtained, thereby improving efficiency of obtaining the diagnosis solution.

BRIEF DESCRIPTION OF THE DRAWINGS

The foregoing and other objectives, features, and advantages of the application will be clearer based on the descriptions of the embodiments of the application made with reference to the accompanying drawings below. In the accompanying drawings.

DETAILED DESCRIPTION OF THE INVENTION

Figure 1:
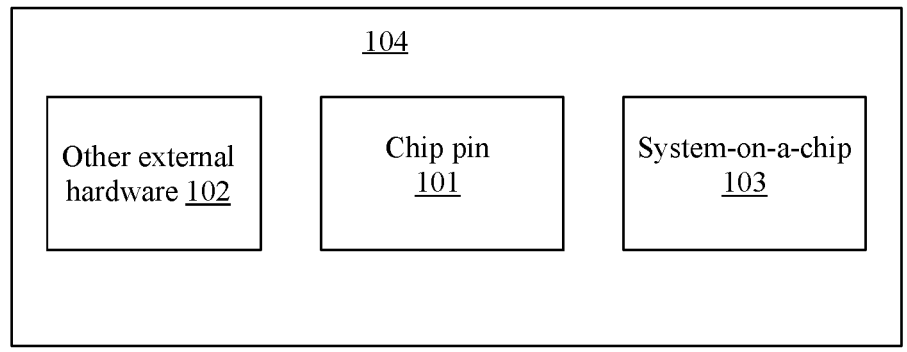
FIG. 1 shows a hardware device for application programming.

The application is described below based on embodiments, but the application is not merely limited to the embodiments. Some specified details are described in the following detailed descriptions of the application. For a person skilled in the art, the application can also be completely understood without the detailed descriptions. To avoid the essence of the application from being confused, existing methods, procedures, and processes are not described in detail. In addition, the accompanying drawings are not necessarily drawn to scale.

Technical terms used herein are described as follows:

An IDE is an application program used to provide a program development environment, and an integrated development software service set with functions such as code writing, analysis, compilation, and debugging. As the IDE integrates various auxiliary tools that are conducive to rapid development, program development can be quickly performed in the IDE.

An IDE terminal is a terminal on which an IDE runs for a user to quickly complete development therein. As an integrated development software service set has integrated functions such as code writing, analysis, compilation, and debugging, the IDE can be used to quickly develop various programs.

A platform server is a server that communicates with IDE terminals, and in response to a request of an IDE terminal, can enrich and improve, according to a requirement of the user, a development environment provided for the user on the IDE terminal (for example, provide the user with various auxiliary code support for development of an application).

A project package is a software set required by the user for development and provided for the development by the user. After obtaining the software set, the user of the IDE terminal can use the software set for development on the IDE terminal. The project package has a plurality of types of components required for development, such as an application component, a development container component, a chip component, a kernel component, and a middleware component.

The application component is a code set supporting application uninstallation and installation. One project package may include a maximum of one application component. Without a project package, an application may not be correctly installed and executed after being developed.

Chip component: A chip is a carrier of program code of an application. The application is the code written on the chip. The chip component is a code set supporting a basic chip operation such as a chip initialization operation. Without the chip, the code cannot be correctly executed after being written, because the chip for installing the code cannot be initialized. There may be one chip component in one project package.

A board component: Although a chip is a carrier of program code of an application, the chip does not exist in isolation, and may be required to be mounted on a board or a plate. In addition to carrying the chip, the board or the plate further carries a peripheral circuit of the chip, such as a power supply circuit or a clock circuit. The board component is a code set providing execution support for the board or the plate, for example, including chip initialization code or peripheral circuit drive code. The board or the plate may be separated from the chip, a board or a plate may match different chips, and a chip may match different boards or plates. Therefore, a development container component and the chip component may also be separate. There may be one development container component in one project package.

Kernel component: In some events, an application may require a real-time operating system. The kernel component is code supporting the real-time operating system. The real-time operating system is a general term for operating systems in embedded IDEs, and has the advantages of being highly real-time, cuttable, and small in size. If an application to be developed requires a real-time operating system, the project package includes the kernel component, or if the application does not require any real-time operating system, the project package may not include the kernel component.

Middleware component: Middleware refers to modules reusable in some applications, and the modules are extracted and referred to as middleware. The middleware may be selectively added to an application. For example, many applications use a function of encapsulating a message according to a message transfer protocol and sending the message out. This function may be separately extracted, and used as middleware, to be reused by more applications. Software code supporting execution of such middleware is referred to as a middleware component. Depending on an actual situation, a project package may or may not include a middleware component.

Compiler: Because the project package is a software set required by the user for development and provided for the development by the user, the software is required by the user for development of the application on the IDE terminal. However, the software code is to be compiled before execution. The compiler is a unit executing code compilation of a project package before the project package is executed.

Error identifier: During code compiling, downloading, executing, if there are situations that code cannot be correctly compiled, downloaded, executed, or the like, users are usually automatically prompted with code on a system. A type of code indicating that an error occurs is referred to as an error identifier. Different errors may have different error identifiers.

An erroneous component detector is an apparatus for detecting, when an error identifier is present, a component of an error indicated by the error identifier in a project package. Because the project package may include an application component, a chip component, a board component, a kernel component, a middleware component, or any combination thereof, the erroneous component may be determined from the application component, the chip component, the board component, the kernel component, the middleware component, or a combination thereof. The erroneous component detector is an apparatus for detecting a component in which an error occurs.

An interaction interface module is a module providing a user with an interaction interface for development. The user may input and edit program code in the interaction interface, to complete application development. The interaction interface may alternatively display various auxiliary functions that may be provided for the user and that are required for application development of the user. The user may use the auxiliary functions for development. In the embodiments of the application, content of the project package supporting development by the user is also displayed in this module.

A diagnosis solution is a measure that is taken to eliminate an error identifier when the error identifier is present. After being obtained, the diagnosis solution is usually displayed in an interface in the IDE, and the user executes the measure, to eliminate the error identifier.

A downloading and executing machine is a unit that downloads the project package compiled by the compiler to the board or the plate to execute the project package, to complete automated development of the application.

The application is applied to an IDE. The IDE is applied to a scenario in which in order to write an application program, an application developer is busy visiting various websites to find various auxiliary software to support the programming. To write an application program, the application developer needs to not only have a compiler but also find many other types of auxiliary software such as a language editor, an automatic creation tool, and a debugger. Therefore, it is desired to find all the auxiliary software in one place. In such a scenario, the IDE comes into being. That is, all other auxiliary software required for application program writing in addition to the compiler is packaged together and placed in an environment. A user may easily write a program in the environment. This environment is referred to as an IDE.

An existing system for providing an embedded IDE allows a specified network resource to be obtained from a platform server into a system. The specified network resource includes software code used to support a hardware environment. For general application development, a hardware environment in which the development is performed is shown in FIG. 1. The hardware environment includes:

(1) a chip pin 101, configured to electrically connect a system-on-a-chip 103 to a circuit board, and transmit a signal through the chip pin 101;

(2) other external hardware 102, soldered on the circuit board, as external hardware that can be used;

(3) a system-on-a-chip (SoC) 103, including an internal intellectual property (IP) core, a peripheral IP core, and usually a storage device such as a static random access memory (SRAM) or a flash memory; and (4) a circuit board 104, configured to carry the foregoing components, and support signal transmission between the components, that is, the boards and the plates described above.

Figure 2:
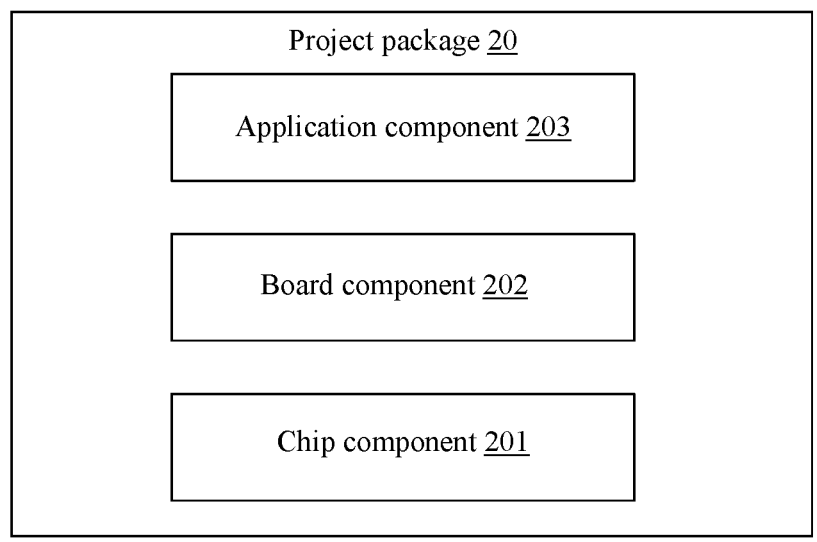
FIG. 2 shows modules included in an IDE project package.

For application development, auxiliary software required for the development is shown in FIG. 2, including an application component 203, a board component 202, and a chip component 201. The application component 203 includes code that is low in coupling with a hardware component and used to implement an application. The chip component 201 includes code for initializing the IP core and the storage device that are included in the system-on-a-chip, mainly code for supporting the system-on-a-chip 103 in FIG. 1. The board component 202 includes code for initializing the circuit board and the chip pin. If other additional hardware devices are soldered on the circuit board, the board component 202 may also include drivers for the hardware devices. Therefore, the board component 202 may mainly include code for supporting the chip pin 101, the other external hardware 102, and the circuit board 104 in FIG. 1. In the IDE, the components may all be integrated into one project package 20 and sent to a user.

Figure 3:
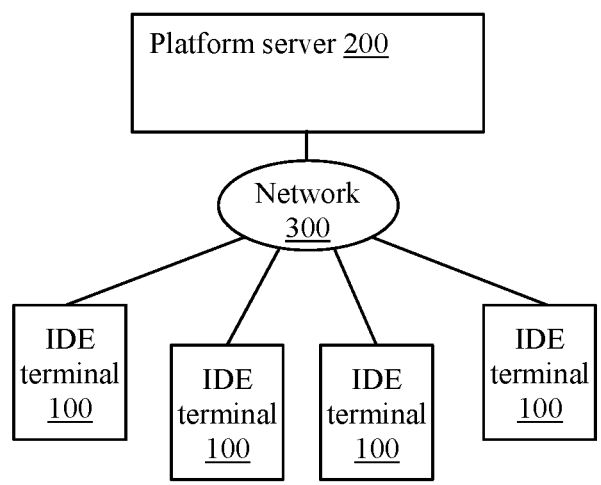
FIG. 3 shows an architecture of an IDE system according to an embodiment of the application.

FIG. 3 shows an architecture applied to an embodiment of the application. The architecture includes a platform server 200, a network 300, and a plurality of IDE terminals 100 communicating with the platform server 200 through the network 300. Different users may use different IDE terminals 100 to request from the platform server 200 through the network 300, project packages required by the users for application development, for the users to complete the development on the IDE terminals 100.

The network 300 may be the Internet, or may be a wired or wireless network. Correspondingly, the communication between the IDE terminal 100 and the platform server 200 through the network 300 may be Internet communication established with the platform server 200 through the Internet, or may be wired or wireless communication established with the platform server 200 through the wired or wireless network.

The IDE terminal 100 is a terminal on which an IDE runs for a user to quickly complete development therein. As an integrated development software service set has integrated functions such as code writing, analysis, compilation, and debugging, the IDE can be used to quickly develop various programs.

The platform server 200 is a server that communicates with the IDE terminal 100, and in response to a request of the IDE terminal, can enrich and improve, according to a requirement of the user, a development environment provided for the user on the IDE terminal (for example, provide the user with various auxiliary code support for development of an application). In some embodiments, in response to a request of the IDE terminal 100, each component (software code) required by the user for development of an application is returned to the IDE terminal 100, for the user to quickly complete the development on the IDE terminal 100.

Figure 4:
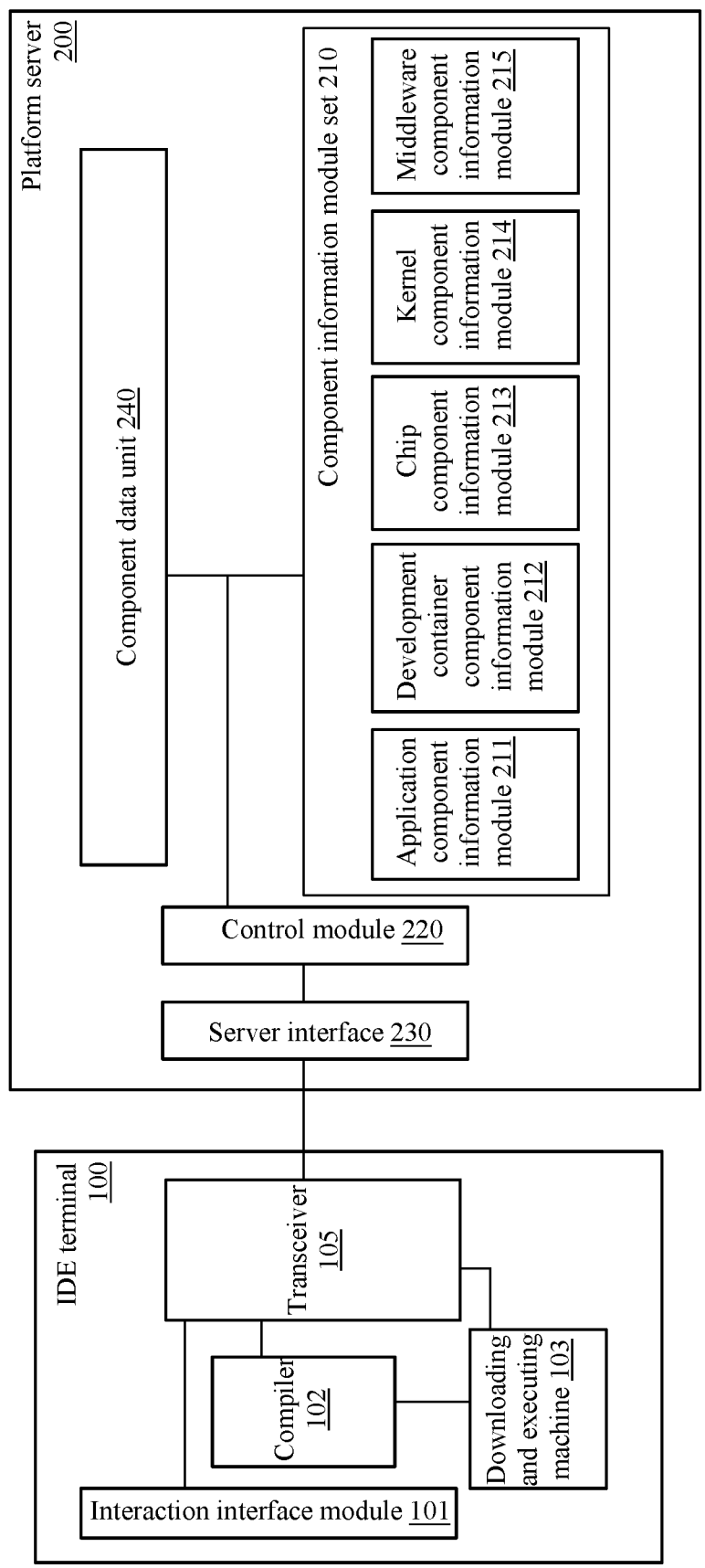
FIG. 4 is a diagram of internal structures of an IDE terminal and a platform server in an existing IDE system.

FIG. 4 is a diagram of internal structures of the IDE terminal 100 and the platform server 200.

As shown in FIG. 4, the IDE terminal 100 includes an interaction interface module 101, a compiler 102, a downloading and executing machine 103, and a transceiver 105.

The interaction interface module 101 is a module providing a user with an interaction interface for development. The user may input or edit program code in the interaction interface, or may select from various auxiliary functions provided in the interaction interface. The user also enters, at a specified location in the interaction interface, information about an application to be developed, such as a name or an identifier of the application, for the platform server 200 to return a project package required for the development of the application to the user, and display the project package in the interaction interface.

The compiler 102 is a unit that compiles the project package when the project package is executed on the IDE terminal 100.

The downloading and executing machine 103 is a unit that downloads the project package compiled by the compiler to a development container to execute the project package, to complete automated development of the application. Because the project package includes various software code that supports the development of the application, after being compiled, the project package may be downloaded to a corresponding development container (a board, a plate, or the like) to be executed. In addition, code written by the user also runs on a chip on which the development container (the board, the plate, or the like) is installed, thereby ensuring execution of the developed application.

The transceiver 105 is a device in the IDE terminal 100 for sending a message to, and receiving a message from, the outside, and may be implemented by using an antenna, a transceiver circuit, or the like.

The platform server 200 includes a server interface 230, a control module 220, a component data unit 240, a component information module set 210 including multiple component information modules, e.g., an application component information module 211, a development container component information module 212, a chip component information module 213, a kernel component information module 214, and a middleware component information module 215, as shown in FIG. 4.

The server interface 230 is an interface for communication between the platform server 200 and devices outside the server 200, mainly for the platform server 230 to complete sending data to, and receiving data from, the devices outside the server 200 such as the IDE terminal 100.

The application component information module 211, the development container component information module 212, the chip component information module 213, the kernel component information module 214, and the middleware component information module 215 are modules respectively storing information about an application component 11, a development container component 12, a chip component 13, a kernel component 14, and a middleware component 15. The information about the application component 11, the development container component 12, the chip component 13, the kernel component 14, and the middleware component 15 includes code of the application component 11, the development container component 12, the chip component 13, the kernel component 14, and the middleware component 15, and other related information (for example, an error identifier and diagnosis solution mapping table described below).

The component data unit 240 includes a component mapping relationship table 241. The table 241 stores mapping relationships between an application identifier and identifiers of the application component 11, the development container component 12, the chip component 13, the kernel component 14, and the middleware component 15. The embodiments of the application may be application-oriented. For example, for an application to be developed, an application component 11, a development container component 12, a chip component 13, a kernel component 14, a middleware component 15 that match the application are determined for the application, and placed in a project package of the application, as shown in FIG. 2. Therefore, an identifier of the application component 11, an identifier of the development container component 12, an identifier of the chip component 13, an identifier of the kernel component 14, and an identifier of the middleware component 15 that match an identifier of the application are pre-stored in the component mapping relationship table 241. In this way, when the identifier of the application is known, the component mapping relationship table 241 may be looked up to obtain the matching identifiers of the application component 11, the development container component 12, the chip component 13, the kernel component 14, and the middleware component 15.

The control module 220 may be a core processing unit of the platform server 200.

The following describes, with reference to the foregoing structure, a process of returning, according to an application to be developed by a user, a project package required by the user to develop the application.

First, the user enters, through the interaction interface module 101, information about the application to be developed by the user. The information may be an identifier of the application. The identifier may be a name of the application, code assigned to the application, or the like. The interaction interface module 101 sends the identifier of the application to the platform server 200 by using the transceiver 105.

The control module 220 receives the identifier of the application sent by the transceiver 105 in the IDE terminal 100, and looks up the component mapping relationship table 241 according to the identifier of the application, to find an identifier of the application component 11, an identifier of the development container component 12, an identifier of the chip component 13, an identifier of the kernel component 14, and an identifier of the middleware component 15 that match the identifier of the application. Then, the control module 220 searches a corresponding application component information module 211, a corresponding development container component information module 212, a corresponding chip component information module 213, a corresponding kernel component information module 214, and a corresponding middleware component information module 215 according to the identifiers, to obtain the corresponding application component 11, the corresponding development container component 12, the corresponding chip component 13, the corresponding kernel component 14, and the corresponding middleware component 15, places the components in an IDE project package, and returns the components to the IDE terminal 100.

The transceiver 105 of the IDE terminal 100 receives the IDE project package, and sends the IDE project package to the compiler 102 for compiling. The downloading and executing machine 103 downloads the compiled IDE project package to a circuit board (board, plate, or the like), executes the IDE project package on the circuit board, and executes written application code on the chip, to enable execution of the application.

The embodiments of the application may focus on how to obtain a diagnosis solution for an error which occurs during compiling by the compiler 102 and downloading and executing by the downloading and executing machine 103. The following describes in detail the embodiments of the application with reference to FIG. 5 to FIG. 7.

Figure 5:
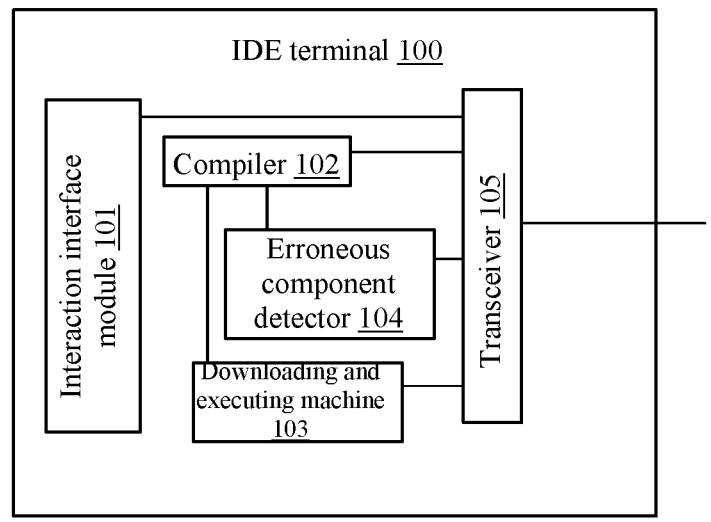
FIG. 5 is a diagram of an internal structure of an IDE terminal according to an embodiment of the application.

FIG. 5 is a diagram of an internal structure of the IDE terminal 100 according to an embodiment of the application. Compared with FIG. 4, the IDE terminal 100 in FIG. 5 further includes an erroneous component detector 104.

The compiler 102 is connected to the erroneous component detector 104. During compilation of a project package received from the platform server, the compiler 102 outputs a first error identifier to the erroneous component detector 104 if an error occurs during the compilation. The first error identifier is an error identifier that is present during the compilation of the project package. An error identifier represents one error. Different errors may have different error identifiers.

The error occurs during the compilation of the project package. The project package includes components. The erroneous component detector 104 may detect an erroneous component in the project package in which the error indicated by the first error identifier is located. For example, the erroneous component detector 104 may locate the erroneous component in which the error indicated by the first error identifier is located from a project view of the project package according to the first error identifier. In addition, the erroneous component detector 104 may also store an error identifier, application, and erroneous component mapping relationship table 243. In the table, each combination of application identifiers and error identifiers may uniquely correspond to an identifier of an erroneous component. Therefore, an identifier of an erroneous component may be uniquely determined in the table according to an identifier of an application to be developed and the first error identifier.

The transceiver 105 sends the first error identifier and the identifier of the erroneous component to the platform server 200.

Figure 6:
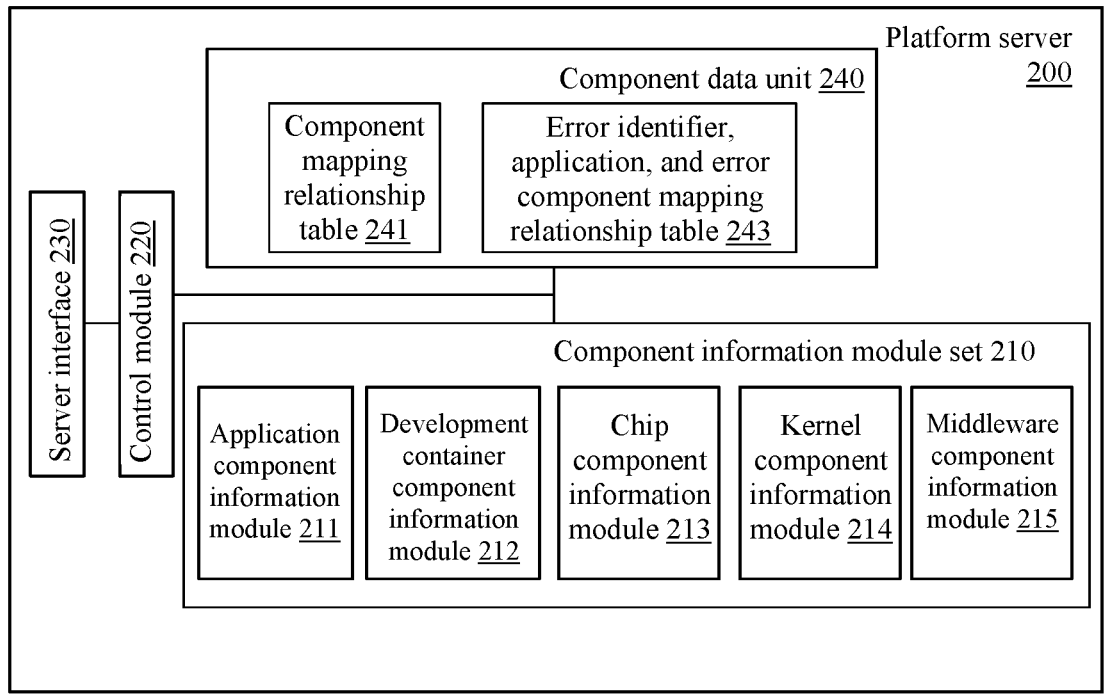
FIG. 6 is a diagram of an internal structure of a platform server according to an embodiment of the application.

FIG. 6 is a diagram of an internal structure of a platform server 200 according to an embodiment of the application. Compared with FIG. 4, an error identifier, application, and erroneous component mapping relationship table 243 is added to the platform server 200. In the table, each combination of application identifiers and error identifiers may uniquely correspond to an identifier of an erroneous component. Therefore, an identifier of an erroneous component may be uniquely determined in the table according to an identifier of an application to be developed and the first error identifier.

The multiple component information modules 211-215 included in the component information module set 210 may first store corresponding components. Each component added to the platform server 200 when the platform server 200 returns a project package to the IDE terminal 100 is obtained from a corresponding component information module. Therefore, a component information module may first store the corresponding component. For example, the application component information module 211 stores an application component, the development container component information module 212 stores a development container component, and the chip component information module 213 stores a chip component. Each of the multiple component information modules 211-215 may further store an error identifier and diagnosis solution mapping table 19 for the corresponding component and information about a developer terminal of the corresponding component. For example, the application component information module 211 stores an error identifier and diagnosis solution mapping table 19 for the application component and information 18 about a developer terminal of the application component (not shown in the FIGS.); the development container component information module 212 stores an error identifier and diagnosis solution mapping table 19 for the development container component and information 18 about a developer terminal of the development container component; and so on. The error identifier and diagnosis solution mapping table 19 stores corresponding diagnosis solutions for the component when various possible error identifiers are present. For example, the error identifier and diagnosis solution mapping table 19 in the application component information module 211 stores corresponding diagnosis solutions for the application component when errors indicated by various error identifiers occur. The information about the developer terminal may be information through which communication can be performed, such as a telephone number or a DingTalk number.

After receiving a first error identifier and an erroneous component that are sent by the IDE terminal 100 because an error occurs during compiling of a project package, the control module 220 looks up an error identifier and diagnosis solution mapping table 19 from component information modules 211-215 corresponding to the erroneous component, to obtain a corresponding diagnosis solution, and returns the diagnosis solution to the IDE terminal 100.

Figure 7:
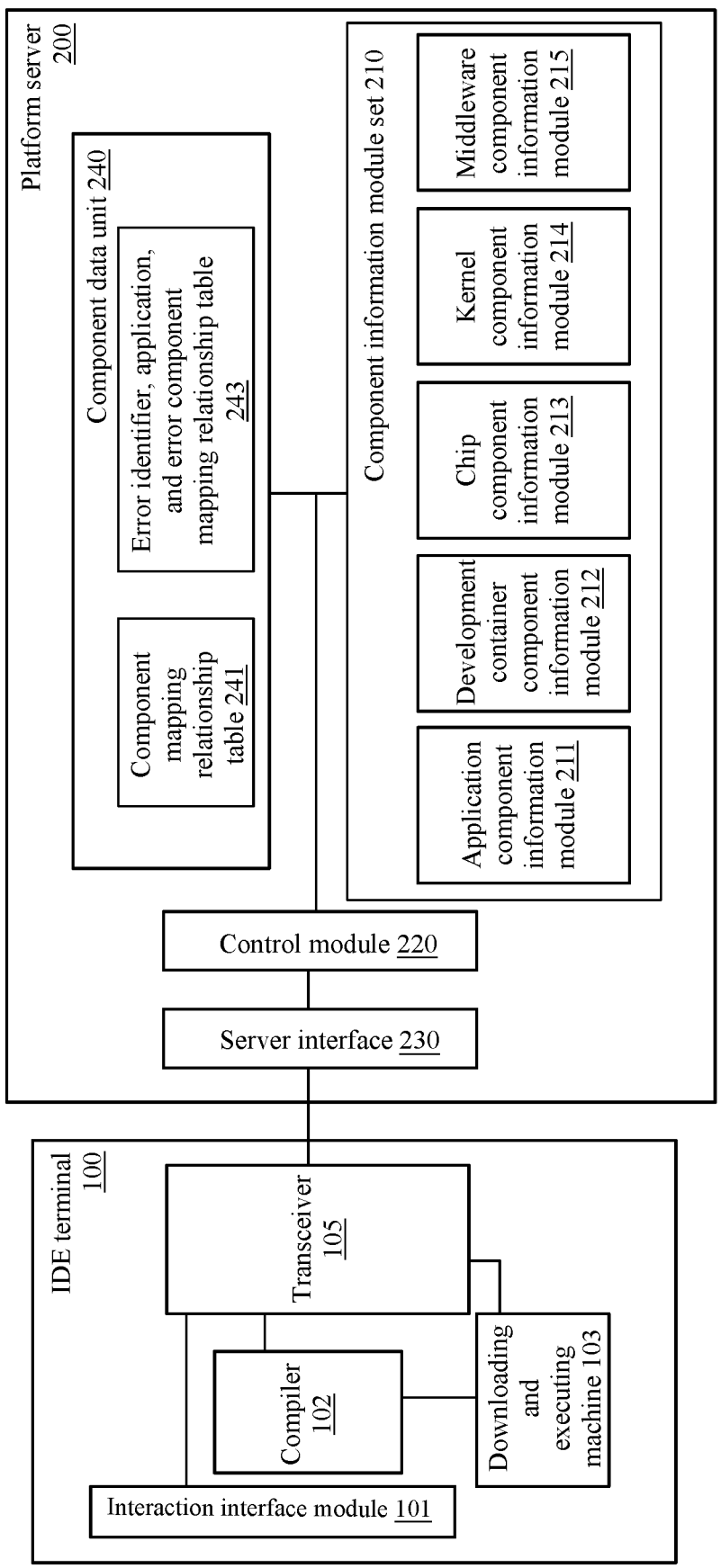
FIG. 7 is a diagram of an overall structure of an IDE system according to an embodiment of the application.
Figure 8:
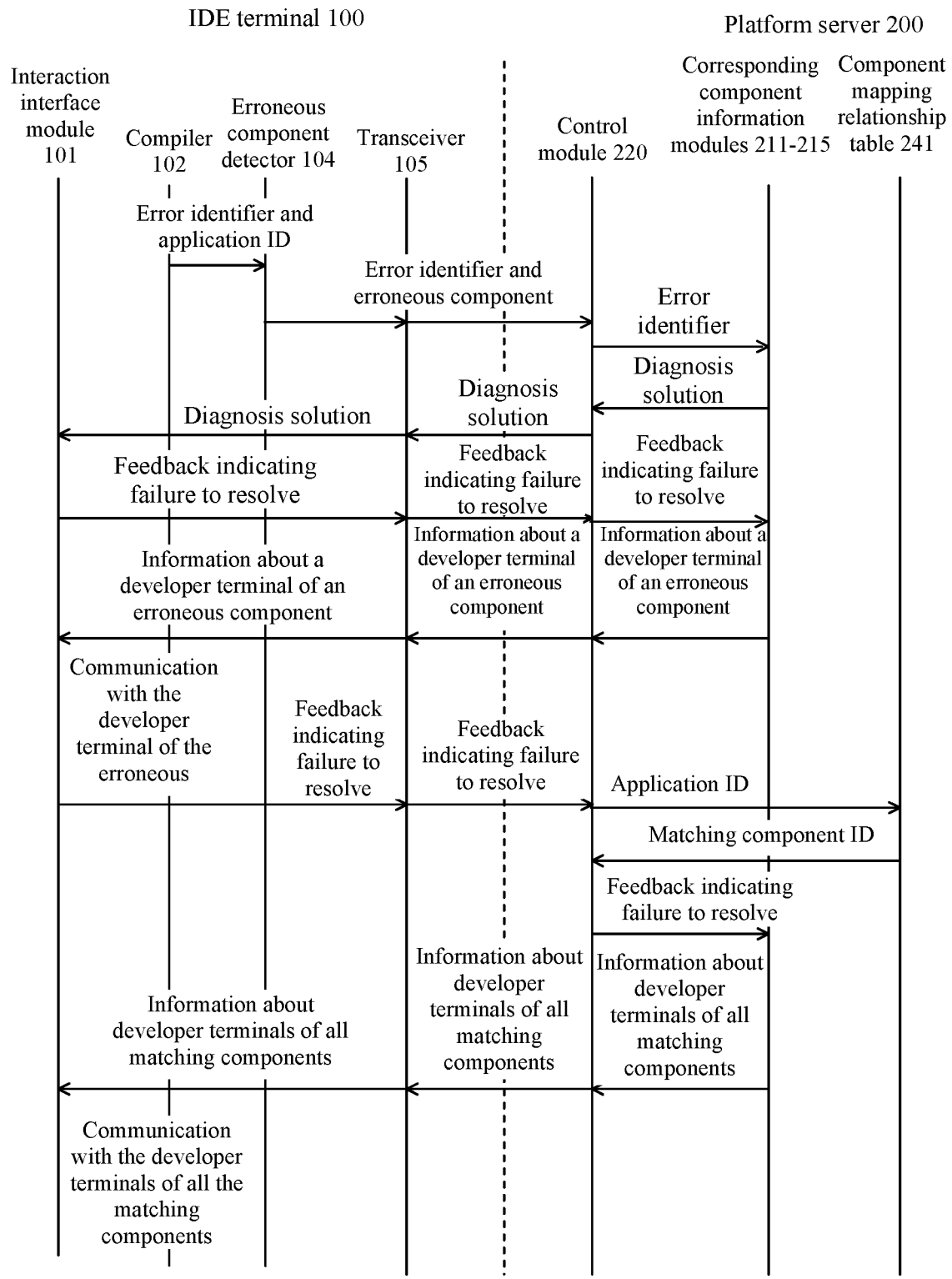
FIG. 8 is an interactive flowchart of processing when an error occurs during compiling of a project package received from a platform server according to an embodiment of the application.
Figure 9:
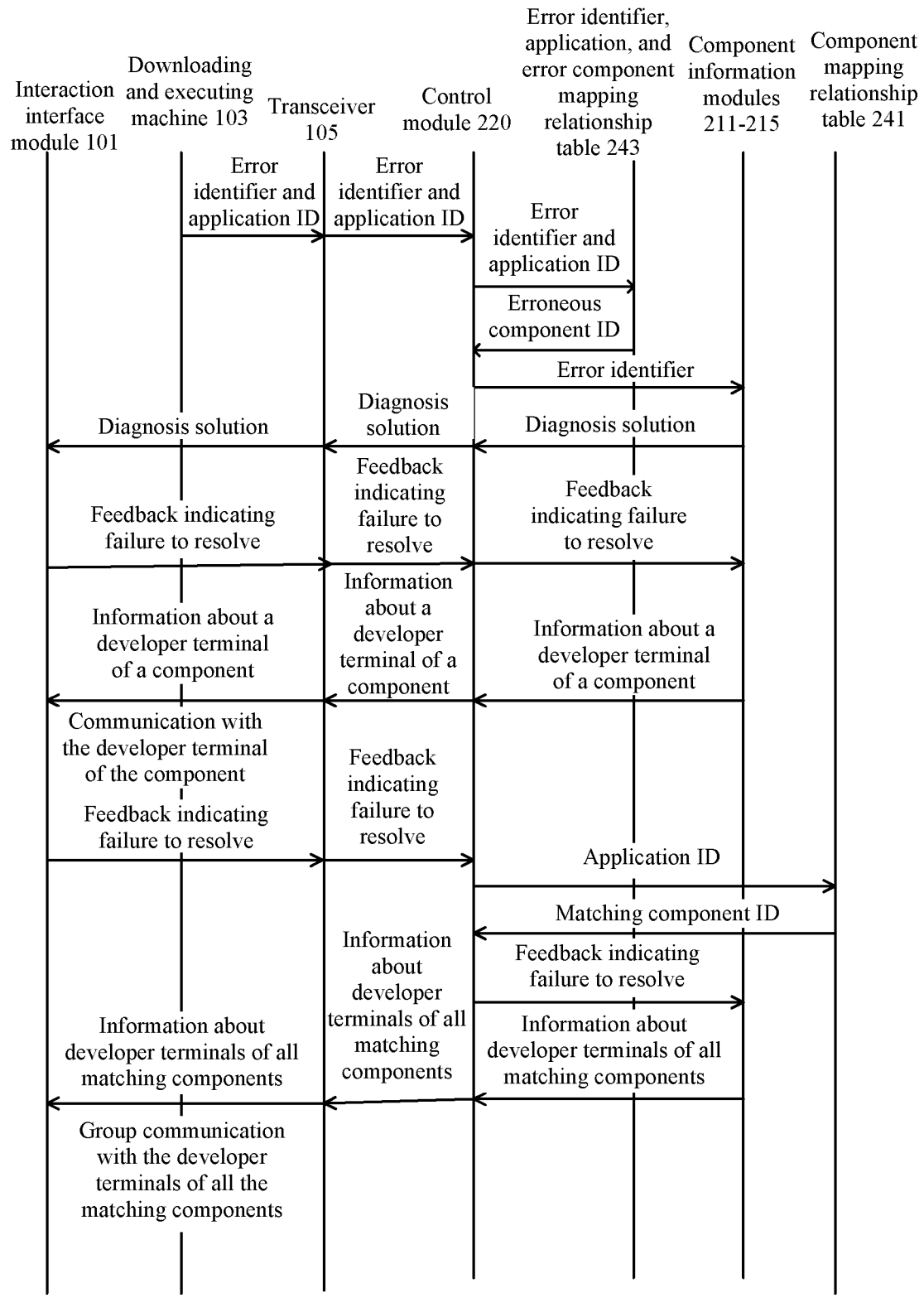
FIG. 9 is an interactive flowchart of processing when an error occurs during downloading and executing a compiled project package according to an embodiment of the application.

FIG. 7 shows an overall system structure in which the IDE terminal 100 and the platform server 200 are connected to each other according to an embodiment of the application. FIG. 8 and FIG. 9 respectively show interaction processes in which, when an error occurs during compiling of a project package and when an error occurs during downloading and executing of a project package, the system in FIG. 6 obtains diagnosis solutions for resolving the errors.

FIG. 8 shows a process of obtaining, when an error occurs during compiling of a project package, a diagnosis solution for resolving the error.

If an error occurs when the compiler 102 compiles a project package obtained by the IDE terminal 100 from the platform server 200, a first error identifier is input to the erroneous component detector 104. When the erroneous component detector 104 looks up an internal error identifier, application, and erroneous component mapping relationship table 243, the compiler 102 further inputs an application identifier to the erroneous component detector 104. The erroneous component detector 104 looks up the internal error identifier, application, and erroneous component mapping relationship table 243 according to the application identifier and the first error identifier, to obtain an identifier of an erroneous component in which the first error identifier is located, and sends the identifier of the erroneous component and the first error identifier to the control module 220. The control module 220 sends the first error identifier to a component information module in the component information modules 211-215 that corresponds to the identifier of the erroneous component, looks up an error identifier and diagnosis solution mapping table 19 in the component information module, to obtain a corresponding diagnosis solution, and sends the corresponding diagnosis solution to the transceiver 105 of the IDE terminal 100. The transceiver 105 sends the corresponding diagnosis solution to the interaction interface module 101 for presentation to a user.

In the foregoing embodiment, if an error occurs during compiling, the platform server returns a diagnosis solution of the erroneous component in which the error is located targeting the error. The entire process is automatic. In the foregoing process, a diagnosis solution is automatically obtained, thereby improving efficiency of obtaining the diagnosis solution.

If the user applies the diagnosis solution on the IDE terminal 100 after learning the diagnosis solution, but finds that the error indicated by the first error identifier has not been resolved, an embodiment of the application further provides a method for automatically establishing communication between a developer terminal of an erroneous component and a user terminal.

As shown in FIG. 8, if a diagnosis solution is not successfully obtained in the foregoing manner of looking up an error identifier and diagnosis solution mapping table 19, a user chooses, in an interface, to contact a developer terminal of an erroneous component, to obtain a diagnosis solution. In this event, the interaction interface module 101 sends a first feedback to the control module 220 of the platform server 200 by using the transceiver 105. The first feedback indicates that the diagnosis solution fails to resolve the error indicated by the first error identifier. The first feedback may carry an identifier of a corresponding diagnosis solution. The control module 220 may identify the corresponding diagnosis solution according to the identifier, to learn of an erroneous component information module that provides the diagnosis solution, and further send the first feedback to the component information module. After receiving the first feedback, the component information module sends information about the corresponding developer terminal to the control module 220. The control module 220 sends the information to the interaction interface module 101 by using the transceiver 105 in the IDE terminal 100, for the interaction interface module 101 to establish communication between a user terminal and the developer terminal according to the information about the developer terminal.

Compared with a manner of existing technologies in which a user needs to manually search for a developer of an erroneous component for manual contact, the foregoing embodiment improves to some extent the automation of establishing communication with a developer terminal of an erroneous component to obtain a diagnosis solution. In addition, a manner of directly contacting a developer terminal is further introduced when an error cannot be resolved, thereby improving a probability that a diagnosis solution is successfully obtained.

If the error indicated by the first error identifier has not been resolved after the communication is established between the user and the developer terminal of the erroneous component, an embodiment of the application further provides a method for automatically establishing group communication between developer terminals of all the components in the project package of the application and the user terminal.

As shown in FIG. 8, if the error indicated by the first error identifier has not been resolved after the communication is established between the user and the developer terminal of the erroneous component, the user chooses, in the interface, to contact developer terminals of all components related to the application, to obtain a diagnosis solution. In this event, the interaction interface module 101 sends a second feedback to the control module 220 of the platform server 200 by using the transceiver 105. The second feedback indicates that the error indicated by the first error identifier has not been resolved after the communication is established with the developer terminal of the erroneous component. The second feedback may carry an identifier of the corresponding diagnosis solution. The control module 220 may identify the corresponding diagnosis solution according to the identifier, to learn of an application identifier corresponding to the diagnosis solution, and look up a component mapping relationship table 241 according to the application identifier. The component mapping relationship table 241 stores a mapping relationship between the application identifier and a corresponding application component identifier, a corresponding development container component identifier, a corresponding chip component identifier, a corresponding kernel component identifier, and a corresponding middleware component identifier. Therefore, the mapping relationship table 241 may be looked up to obtain the application component identifier, the development container component identifier, the chip component identifier, the kernel component identifier, and the middleware component identifier that correspond to the application identifier, to obtain information about a developer terminal of an application component, information about a developer terminal of a development container component, information about a developer terminal of a chip component, information about a developer terminal of a kernel component, and information about a developer terminal of a middleware component from an application component information module 211, a development container component information module 212, a chip component information module 213, a kernel component information module 214, and a middleware component information module 215 that respectively correspond to these identifiers, and return all the contact information to the interaction interface module 101 by using the transceiver 105 of the IDE terminal 100, for the interaction interface module to cause, by using the contact information, the user terminal to perform group communication with the developer terminal of the application component, the developer terminal of the development container component, the developer terminal of the chip component, the developer terminal of the kernel component, and the developer terminal of the middleware component. The group communication may be established as follows. A group is established on social application software such as DingTalk, and the user and all the developer terminals are used as group members for communication, or an email may be sent to the user and all the developer terminals as email recipients, and then the user and all the developer terminals may discuss with one another by replying to all.

If the error indicated by the first error identifier has not been resolved in the foregoing embodiment in which the communication is established between the user and the developer terminal of the erroneous component, group communication is automatically established with all developer terminals of components related to the application, thereby improving a probability that a diagnosis solution is successfully obtained. In addition, compared with an existing manner in which a user searches for developer terminals of various components related to an application one by one and manually establishes communication, efficiency is greatly improved.

As described above, an error identifier and diagnosis solution mapping table in component information module stores, for each component, a corresponding diagnosis solution when various error identifiers are present. If a diagnosis solution obtained by looking up the error identifier and diagnosis solution mapping table is returned to the user, and an error indicated by an error identifier cannot be resolved according to the obtained diagnosis solution, a corresponding diagnosis solution is determined through communication with a developer terminal of an erroneous component or through group communication with developer terminals of all components related to the application. In other embodiments, these diagnosis solutions may be further used to enrich and improve the error identifier and diagnosis solution mapping table in the component information module, to improve a probability that a diagnosis solution returned to a user resolves a user problem next time when the diagnosis solution is provided for the user.

Therefore, in FIG. 8, if the error indicated by the first error identifier is resolved after the communication is established with the developer terminal of the erroneous component or the group communication is established with the developer terminals of all the components, the interaction interface module 101 may obtain a diagnosis solution corresponding to the first error identifier from a communication record, and send the diagnosis solution to the control module 220 of the platform server 200 by using the transceiver 105.

If the error indicated by the first error identifier is resolved after the communication is established with the developer terminal of the erroneous component, the control module 220 stores the diagnosis solution and the first error identifier in correspondence with each other in the error identifier and diagnosis solution mapping table 19 in the erroneous component information module, to implement update. There may be two manners of storage. In one manner, the diagnosis solution and the first error identifier are stored in correspondence with each other in the error identifier and diagnosis solution mapping table 19 in the erroneous component information module, to replace an original diagnosis solution corresponding to the first error identifier in the mapping table 19. In the other manner, the diagnosis solution and the first error identifier are additionally stored in the mapping table 19 without replacement. In the latter case, when the control module 220 subsequently searches the mapping table 19 for a diagnosis solution corresponding to the first error identifier, two diagnosis solutions can be determined. Both the diagnosis solutions may be returned to the IDE terminal 100, for the user to select a diagnosis solution for use.

If the error indicated by the first error identifier is resolved after the communication is established with the developer terminals of all the components, the interaction interface module 101 further obtain, from a group communication record, an identifier of a component to which a developer terminal providing a diagnosis solution belongs, and sends both the identifier of the component and the diagnosis solution to the control module 220 of the platform server 200 by using the transceiver 105. The control module 220 stores the diagnosis solution and the first error identifier in correspondence with each other in an error identifier and diagnosis solution mapping table 19 in a component information module corresponding to the identifier of the component, to implement update. There may be two storage manners as described above.

Sometimes, when a diagnosis solution cannot resolve an error that occurs, it is not because the diagnosis solution is incorrect, but because the IDE terminal 100 is interfered by some other factors. Therefore, if the mapping table is updated without further consideration whenever a diagnosis solution corresponding to an error identifier provided in the mapping table cannot resolve an error indicated by the error identifier, some diagnosis solutions may be accidentally misplaced into the mapping table, reducing effectiveness of subsequently resolving the error. Therefore, in another embodiment, a record table (not shown) may be added to the platform server 200. If the error indicated by the first error identifier is resolved after the communication is established with the developer terminal of the erroneous component or the group communication is established with the developer terminals of all the components, the interaction interface module 101 obtains a diagnosis solution corresponding to the first error identifier from a communication record, and notifies the control module 220 by using the transceiver 105. The control module 220 records the diagnosis solution in a record table instead of immediately updating the diagnosis solution in the error identifier and diagnosis solution mapping table 19 of the component information module, and updates the diagnosis solution that corresponds to the first error identifier and that is stored in the corresponding component information module once diagnosis solutions that correspond to the first error identifier and that are recorded in the record table reach a predetermined quantity of times. For example, when identical diagnosis solutions corresponding to the first error identifier and stored in the record table reach a predetermined quantity, the error identifier and diagnosis solution mapping table 19 may be updated based on the identical diagnosis solutions. In such a manner, impact of some accidental factors on the diagnosis solution of the error identifier is reduced, thereby enabling update of the error identifier and diagnosis solution mapping table 19 of the component information module to reflect objective reality.

FIG. 9 shows a process of obtaining, when an error occurs during downloading of a project package to a circuit board (board, plate, or the like) for execution, a diagnosis solution for resolving the error.

When the downloading and executing machine 103 downloads the compiled project package to the circuit board (board, plate, or the like) and executes the project package, if an error occurs, the downloading and executing machine 103 sends a second error identifier to the transceiver 105, and also sends an application identifier to the transceiver 105. Different from the event of compiling, during downloading and executing, the IDE terminal 100 may not be able to determine which component has the second error identifier. Therefore, the transceiver 105 sends the second error identifier and the application identifier to the control module 220. The platform server 200 has an error identifier, application, and erroneous component mapping relationship table 243 that stores mapping relationships between erroneous component identifiers and different combinations of error identifiers and application identifiers. Therefore, the control module 220 looks up the mapping relationship table 243 according to the application identifier and the second error identifier, to obtain a corresponding erroneous component identifier, and sends an error identifier to a component information module corresponding to the erroneous component identifier. The component information module stores an error identifier and diagnosis solution mapping table 19 for the component. The mapping table 19 is looked up based on the second error identifier, to obtain a corresponding diagnosis solution, and the corresponding diagnosis solution is sent to the transceiver 105 of the IDE terminal 100. The transceiver 105 sends the corresponding diagnosis solution to the interaction interface module 101 for presentation to a user.

In the foregoing embodiment, if an error occurs during downloading and executing, the platform server returns a diagnosis solution of an erroneous component in which the error is located targeting the error. The entire process is automatic. In the foregoing process, a diagnosis solution is automatically obtained, thereby improving efficiency of obtaining the diagnosis solution.

If the user applies the diagnosis solution on the IDE terminal 100 after learning the diagnosis solution, but finds that the error indicated by the second error identifier has not been resolved, an embodiment of the application further provides a method for automatically establishing communication between a developer terminal of an erroneous component and a user terminal.

As shown in FIG. 9, if a diagnosis solution is not successfully obtained in the foregoing manner of looking up an error identifier and diagnosis solution mapping table 19, a user chooses, in an interface, to contact a developer terminal of an erroneous component, to obtain a diagnosis solution. In this event, the interaction interface module 101 sends a first feedback to the control module 220 of the platform server 200 by using the transceiver 105. The first feedback indicates that the diagnosis solution fails to resolve the error indicated by the second error identifier. The first feedback may carry an identifier of a corresponding diagnosis solution. The control module 220 may identify the corresponding diagnosis solution according to the identifier, to learn of an erroneous component information module that provides the diagnosis solution, and further send the first feedback to the component information module. After receiving the first feedback, the component information module sends information about the corresponding developer terminal to the control module 220. The control module 220 sends the information to the interaction interface module 101 by using the transceiver 105 in the IDE terminal 100, for the interaction interface module 101 to establish communication between a user terminal and the developer terminal according to the information.

Compared with a manner of existing technologies in which a user needs to manually search for a developer terminal of an erroneous component for manual contact, the foregoing embodiment improves a degree of automation of establishing communication with a developer terminal of an erroneous component to obtain a diagnosis solution. In addition, not only the foregoing manner of looking up a common error identifier and diagnosis solution mapping relationship is used, but also a manner of directly contacting a developer terminal is further introduced when an error cannot be resolved, thereby improving a probability that a diagnosis solution is successfully obtained.

If the error indicated by the second error identifier has not been resolved after the communication is established between the user and the developer terminal of the erroneous component, an embodiment of the application further provides a method for automatically establishing group communication between developer terminals of all the components in the project package of the application and the user terminal.

As shown in FIG. 9, if the error indicated by the second error identifier has not been resolved after the communication is established between the user and the developer terminal of the erroneous component, the user chooses, in the interface, to contact developer terminals of all components related to the application, to obtain a diagnosis solution. In this event, the interaction interface module 101 sends a second feedback to the control module 220 of the platform server 200 by using the transceiver 105. The second feedback indicates that the error indicated by the second error identifier has not been resolved after the communication is established with the developer terminal of the erroneous component. The second feedback may carry an identifier of the corresponding diagnosis solution. The control module 220 may identify the corresponding diagnosis solution according to the identifier, to learn of an application identifier corresponding to the diagnosis solution, and look up a component mapping relationship table 241 according to the application identifier. The component mapping relationship table 241 stores mapping relationships between the application identifier and a corresponding application component identifier, a corresponding development container component identifier, a corresponding chip component identifier, a corresponding kernel component identifier, and a corresponding middleware component identifier. Therefore, the mapping relationship table 241 may be looked up to obtain the application component identifier, the development container component identifier, the chip component identifier, the kernel component identifier, and the middleware component identifier that correspond to the application identifier, to obtain information about a developer terminal of an application component, information about a developer terminal of a development container component, information about a developer terminal of a chip component, information about a developer terminal of a kernel component, and information about a developer terminal of a middleware component from an application component information module 211, a development container component information module 212, a chip component information module 213, a kernel component information module 214, and a middleware component information module 215 that respectively correspond to these identifiers, and return all the information to the interaction interface module 101 by using the transceiver 105 of the IDE terminal 100, for the interaction interface module to cause, by using the contact information, the user terminal to perform group communication with the developer terminal of the application component, the developer terminal of the development container component, the developer terminal of the chip component, the developer terminal of the kernel component, and the developer terminal of the middleware component. The group communication may be established as follows. A group is established on social application software such as DingTalk, and the user and all the developer terminals are used as group members for communication, or an email may be sent to the user and all the developer terminals as email recipients, and then the user and all the developer terminals may discuss with each other by replying to all.

If the error indicated by the second error identifier has not been resolved in the foregoing embodiment in which the communication is established between the user and the developer terminal of the erroneous component, group communication is automatically established with all developer terminals of components related to the application, thereby improving a probability that a diagnosis solution is successfully obtained. In addition, compared with an existing manner in which a user searches for developer terminals of various components related to an application one by one and manually establishes communication, efficiency is greatly improved.

As described above, an error identifier and diagnosis solution mapping table in component information module stores, for each component, a corresponding diagnosis solution when each of various error identifiers is present. If a diagnosis solution obtained by looking up the error identifier and diagnosis solution mapping table is returned to the user, and an error indicate by an error identifier cannot be resolved according to the obtained diagnosis solution, a corresponding diagnosis solution is determined through communication with a developer terminal of an erroneous component or through group communication with developer terminals of all components related to the application. In other embodiments, these diagnosis solutions may be further used to enrich and improve the error identifier and diagnosis solution mapping table in the component information module, to improve a probability that a diagnosis solution returned to a user resolves a user problem next time when the diagnosis solution is provided for the user.

Therefore, in FIG. 9, if the error indicated by the second error identifier is resolved after the communication is established with the developer terminal of the erroneous component or the group communication is established with the developer terminals of all the components, the interaction interface module 101 may obtain a diagnosis solution corresponding to the second error identifier from a communication record, and send the diagnosis solution to the control module 220 of the platform server 200 by using the transceiver 105.

If the error indicated by the second error identifier is resolved after the communication is established with the developer terminal of the erroneous component, the control module 220 stores the diagnosis solution and the second error identifier in correspondence with each other in the error identifier and diagnosis solution mapping table 19 in the erroneous component information module, to implement update. Alternatively, there may be two manners of storage. In one manner, the diagnosis solution and the second error identifier are stored in correspondence with each other in the error identifier and diagnosis solution mapping table 19 in the erroneous component information module, to replace an original diagnosis solution corresponding to the second error identifier in the mapping table 19. In the other manner, the diagnosis solution and the second error identifier are additionally stored in the mapping table 19 without replacement. In the latter case, when the control module 220 subsequently searches the mapping table 19 for a diagnosis solution corresponding to the second error identifier, two diagnosis solutions can be determined. Both the diagnosis solutions may be returned to the IDE terminal 100, for the user to select a diagnosis solution for use.

If the error indicated by the second error identifier is resolved after the communication is established with the developer terminals of all the components, the interaction interface module 101 further obtain, from a group communication record, an identifier of a component to which a developer terminal providing a diagnosis solution belongs, and sends both the identifier of the component and the diagnosis solution to the control module 220 of the platform server 200 by using the transceiver 105. The control module 220 stores the diagnosis solution and the second error identifier in correspondence with each other in an error identifier and diagnosis solution mapping table 19 in a component information module corresponding to the identifier of the component, to implement update. There may be two storage manners as described above.

Sometimes, when a diagnosis solution cannot resolve an error that occurs, it is not because the diagnosis solution is incorrect, but because the IDE terminal 100 is interfered by some other factors. Therefore, if the mapping table is updated without further consideration whenever a diagnosis solution corresponding to an error identifier provided in the mapping table cannot resolve an error indicated by the error identifier, some diagnosis solutions may be accidentally misplaced into the mapping table, reducing effectiveness of subsequently resolving the error. Therefore, in another embodiment, a record table (not shown) may be added to the platform server 200. If the error indicated by the second error identifier is resolved after the communication is established with the developer terminal of the erroneous component or the group communication is established with the developer terminals of all the components, the interaction interface module 101 obtains a diagnosis solution corresponding to the second error identifier from a communication record, and notifies the control module 220 by using the transceiver 105. The control module 220 records the diagnosis solution in a record table instead of immediately updating the diagnosis solution in the error identifier and diagnosis solution mapping table 19 of the component information module, and updates the diagnosis solution that corresponds to the second error identifier and that is stored in the corresponding component information module once diagnosis solutions that correspond to the second error identifier and that are recorded in the record table reach a predetermined quantity of times. For example, when identical diagnosis solutions corresponding to the first error identifier and stored in the record table reach a predetermined quantity, the error identifier and diagnosis solution mapping table 19 may be updated based on the identical diagnosis solutions. In such a manner, impact of some accidental factors on the diagnosis solution of the error identifier is reduced, thereby enabling update of the error identifier and diagnosis solution mapping table 19 of the component information module to reflect objective reality.

In addition, according to the embodiments of the application, error handling methods on the IDE terminal 100 and the platform server 200 are further provided. The error handling methods have been described in detail above in the foregoing embodiments with reference to structures and actions of all components of the IDE terminal 100 and the platform server 200. For brevity, the details are not described herein again.

A person skilled in the art can understand that the application may be implemented as a system, a method, and a computer program product. Therefore, the application may be implemented in the following forms, that is, the form of complete hardware, complete software (including firmware, resident software, and micro code), or may be implemented in the form of a combination of software and hardware. In addition, in some embodiments, the application may further be implemented in the form of one or more computer program products in a computer-readable medium. The computer-readable medium includes computer-readable program code.

Any combination of one or more computer-readable media may be used. The computer-readable medium may be a computer-readable signal medium or a computer-readable storage medium. The computer-readable storage medium may be, for example, but is not limited to, an electric, magnetic, optical, electromagnetic, infrared, or semi-conductive system, apparatus, or device, or any other combination thereof. A more detailed example of the computer-readable storage medium may include: an electrical connection having one or more wires, a portable computer magnetic disk, a hard disk, a RAM, a ROM, an erasable programmable read-only memory (EPROM or flash memory), an optical fiber, a portable compact disk read-only memory (CD-ROM), an optical storage device, a magnetic storage device, or any appropriate combination thereof. In this specification, the computer-readable storage medium may be any tangible medium containing or storing a program, and the program may be used by or used in combination with a processing unit, an apparatus, or a device.

The computer-readable signal medium may include a data signal being in a baseband or propagated as a part of a carrier, the data signal carrying computer-readable program code. The propagated data signal may be in a plurality of forms, including, but not limited to, an electromagnetic signal, an optical signal, or any other appropriate combination thereof. The computer-readable signal medium may further include any computer-readable medium in addition to a computer-readable storage medium. The computer-readable medium may send, propagate, or transmit a program that is used by or used in conjunction with an instruction system, an apparatus, or a device.

The program code included in the computer-readable medium may be transmitted by using any suitable medium, including but not limited to, wireless transmission, a wire, a cable, radio frequency (RF) or the like, or any other suitable combination thereof.

The computer program code used for executing the embodiments of the application may be written by using one or more programming languages or a combination thereof. The programming languages include an object-oriented programming language such as Java and C++, and may also include a conventional procedural programming language such as C. The program code may be executed entirely on a computer of a user, partly on the computer of the user, as a stand-alone software package, partly on the computer of the user and partly on a remote computer, or entirely on the remote computer or a server. In the event involving a remote computer, the remote computer may be connected to a computer of a user through any type of network including a local area network (LAN) or a wide area network (WAN), or may be connected to an external computer (for example, through the Internet by using an Internet service provider).

The foregoing descriptions are merely embodiments of the application, but are not intended to limit the application. For a person skilled in the art, various modifications and variations can be made on the application. Any modification, equivalent replacement, or improvement made within the spirit and principle of the application shall fall within the protection scope of the application.

What is claimed is:

1. A computer-implemented method for error handling, applicable to an integrated development environment (IDE) system comprising a server and an IDE terminal, the method comprising:
   receiving, by the IDE terminal, a project package for development of an application from the server, wherein the project package comprises a plurality of components supporting the development of the application;
   compiling, by the IDE terminal using a compiler, the project package;
   in response to that a first error occurs during the compiling of the project package:
      identifying, by the IDE terminal, a first erroneous component from the plurality of components in the project package based on the first error, and
      sending information of the first erroneous component and the first error to the server;
   in response to that no error occurs during the compiling of the project package:

downloading, by the IDE terminal, the compiled project package into a development container for execution;

in response to that a second error occurs during the downloading or the execution of the project package:
sending, by the IDE terminal, the second error and an identifier of the application to the server to identify a second erroneous component;

in response to the first or second error occurred, receiving, by the IDE terminal, a diagnosis solution corresponding to the first or second error and the first or second erroneous component;

executing, by the IDE terminal, the received diagnosis solution;

in response to the received diagnosis solution failed to resolve the first or second error, sending a first feedback from the IDE terminal to the server;

receiving, from the server in response to the first feedback, information of a developer terminal corresponding to the first or second erroneous component;

automatically triggering different application software to establish an individual communication with the developer terminal corresponding to the first or second erroneous component;

sending a second feedback from the IDE terminal to the server, wherein the second feedback indicates that the first or second error has not been resolved after the individual communication is established with the developer terminal; and receiving information of a plurality of developer terminals corresponding to the plurality of components from the server, for the IDE terminal to trigger the different application software to establish a group communication with the plurality of developer terminals corresponding to the plurality of components.

2. The computer-implemented method according to claim 1, wherein to identify the second erroneous component, the server is configured to:
look up an error identifier, application, and erroneous component mapping relationship table stored on the server to determine the second erroneous component according to the second error identifier and the application.

3. The computer-implemented method according to claim 1, wherein the plurality of components comprise an application component, a chip component, a board component, a kernel component, a middleware component that correspond to the application, or a combination thereof; and the first or second erroneous component comprises the chip component, the board component, the kernel component, the middleware component, or a combination thereof.

4. The computer-implemented method according to claim 1, further comprising:
if the first error is resolved after the individual communication is established with the developer terminal of the first erroneous component or the group communication is established with the developer terminals of the plurality of components, sending, to the server, a diagnosis solution that corresponds to the first error and is obtained by the IDE terminal from a record of the individual communication with the developer terminal of the first erroneous component or a record of the group communication with the developer terminals of the plurality of components.

5. The computer-implemented method according to claim 1, further comprising:
if the second error is resolved after the individual communication is established with the developer terminal of the second erroneous component or the group communication is established with the developer terminals of the plurality of components, sending, to the server, a diagnosis solution that corresponds to the second error and is obtained by the IDE terminal from a record of the individual communication with the developer terminal of the second erroneous component or a record of the group communication with the developer terminals of the plurality of components for storing on the server.

6. The computer-implemented method of claim 1, wherein the execution comprises:
executing code on a chip on which the development container is installed.

7. The computer-implemented method of claim 1, wherein the development container comprises a board or a plate.

8. An apparatus for error handling, applicable to an integrated development environment (IDE) system comprising a server and an IDE terminal, the apparatus comprising: one or more processors and one or more non-transitory computer-readable memories coupled to the one or more processors and configured with instructions executable by the one or more processors to cause the apparatus to perform operations comprising:
receiving, by the IDE terminal, a project package for development of an application from the server, wherein the project package comprises a plurality of components supporting the development of the application;
compiling, by the IDE terminal using a compiler, the project package;
in response to that a first error occurs during the compiling of the project package:
identifying, by the IDE terminal, a first erroneous component from the plurality of components in the project package based on the first error, and
sending information of the first erroneous component and the first error to the server;
in response to that no error occurs during the compiling of the project package:
downloading, by the IDE terminal, the compiled project package into a development container for execution;
in response to that a second error occurs during the downloading or the execution of the project package:
sending, by the IDE terminal, the second error and an identifier of the application to the server to identify a second erroneous component;
in response to the first or second error occurred, receiving, by the IDE terminal, a diagnosis solution corresponding to the first or second error and the first or second erroneous component;
executing, by the IDE terminal, the received diagnosis solution;
in response to the received diagnosis solution failed to resolve the first or second error, sending a first feedback from the IDE terminal to the server;
receiving, from the server in response to the first feedback, information of a developer terminal corresponding to the first or second erroneous component;
automatically triggering different application software to establish an individual communication with the developer terminal corresponding to the first or second erroneous component;

sending a second feedback from the IDE terminal to the server, wherein the second feedback indicates that the first or second error has not been resolved after the individual communication is established with the developer terminal; and receiving information of a plurality of developer terminals corresponding to the plurality of components from the server, for the IDE terminal to trigger the different application software to establish a group communication with the plurality of developer terminals corresponding to the plurality of components.

9. The apparatus according to claim 8, wherein to identify the second erroneous component, the server is configured to:
look up an error identifier, application, and erroneous component mapping relationship table stored on the server to determine the second erroneous component according to the second error identifier and the application.

10. The apparatus according to claim 8, wherein the plurality of components comprise an application component, a chip component, a board component, a kernel component, a middleware component that correspond to the application, or a combination thereof; and the first or second erroneous component comprises the chip component, the board component, the kernel component, the middleware component, or a combination thereof.

11. The apparatus according to claim 8, wherein the operations further comprise:
if the first error is resolved after the individual communication is established with the developer terminal of the first erroneous component or the group communication is established with the developer terminals of the plurality of components, sending, to the server, a diagnosis solution that corresponds to the first error and is obtained by the IDE terminal from a record of the individual communication with the developer terminal of the first erroneous component or a record of the group communication with the developer terminals of the plurality of components.

12. The apparatus according to claim 8, wherein the operations further comprise:
if the second error is resolved after the individual communication is established with the developer terminal of the second erroneous component or the group communication is established with the developer terminals of the plurality of components, sending, to the server, a diagnosis solution that corresponds to the second error and is obtained by the IDE terminal from a record of the individual communication with the developer terminal of the second erroneous component or a record of the group communication with the developer terminals of the plurality of components for storing on the server.

13. The apparatus of claim 8, wherein the execution comprises:
executing code on a chip on which the development container is installed.

14. The apparatus of claim 8, wherein the development container comprises a board or a plate.

15. A non-transitory computer-readable storage medium configured with instructions executable by one or more processors to cause the one or more processors to perform operations comprising:
receiving, by an IDE terminal, a project package for development of an application from a server, wherein the project package comprises a plurality of components supporting the development of the application;

compiling, by the IDE terminal using a compiler, the project package;

in response to that a first error occurs during the compiling of the project package:
identifying, by the IDE terminal, a first erroneous component from the plurality of components in the project package based on the first error, and
sending information of the first erroneous component and the first error to the server;

in response to that no error occurs during the compiling of the project package:
downloading, by the IDE terminal, the compiled project package into a development container for execution;
in response to that a second error occurs during the downloading or the execution of the project package:
sending, by the IDE terminal, the second error and an identifier of the application to the server to identify a second erroneous component;

in response to the first or second error occurred, receiving, by the IDE terminal, a diagnosis solution corresponding to the first or second error and the first or second erroneous component;

executing, by the IDE terminal, the received diagnosis solution;

in response to the received diagnosis solution failed to resolve the first or second error, sending a first feedback from the IDE terminal to the server;

receiving, from the server in response to the first feedback, information of a developer terminal corresponding to the first or second erroneous component;

automatically triggering different application software to establish an individual communication with the developer terminal corresponding to the first or second erroneous component;

sending a second feedback from the IDE terminal to the server, wherein the second feedback indicates that the first or second error has not been resolved after the individual communication is established with the developer; and receiving information of a plurality of developer terminals corresponding to the plurality of components from the server, for the IDE terminal to trigger the different application software to establish a group communication with the plurality of developer terminals corresponding to the plurality of components.

16. The non-transitory computer-readable storage medium according to claim 15, wherein to identify the second erroneous component the server is configured to:
look up an error identifier, application, and erroneous component mapping relationship table stored on the server to determine the second erroneous component according to the second error identifier and the application.

17. The non-transitory computer-readable storage medium according to claim 15, wherein the execution comprises:
executing code on a chip on which the development container is installed.

18. The non-transitory computer-readable storage medium according to claim 15, wherein the development container comprises a board or a plate.

* * * * *